United States Patent
Leonard

(10) Patent No.: US 11,702,370 B2
(45) Date of Patent: Jul. 18, 2023

(54) SYSTEMS, DEVICES, AND METHODS FOR MANUFACTURING CARBON CERAMIC BRAKE DISCS

(71) Applicant: SiC Technologies, Inc., Costa Mesa, CA (US)

(72) Inventor: Clifford B. Leonard, Costa Mesa, CA (US)

(73) Assignee: SiC Technologies, Inc., Costa Mesa, CA (US)

( * ) Notice: Subject to any disclaimer, the term of this patent is extended or adjusted under 35 U.S.C. 154(b) by 925 days.

(21) Appl. No.: 16/244,670

(22) Filed: Jan. 10, 2019

(65) Prior Publication Data

US 2019/0219120 A1 Jul. 18, 2019

Related U.S. Application Data

(60) Provisional application No. 62/615,735, filed on Jan. 10, 2018.

(51) Int. Cl.
  *C04B 35/65* (2006.01)
  *C04B 35/573* (2006.01)
  (Continued)

(52) U.S. Cl.
  CPC .......... *C04B 35/573* (2013.01); *B32B 18/00* (2013.01); *C04B 35/571* (2013.01);
  (Continued)

(58) Field of Classification Search
  CPC ............... C04B 35/65; C04B 35/657; C04B 2235/3826; C04B 2235/428;
  (Continued)

(56) References Cited

U.S. PATENT DOCUMENTS

| 7,993,549 B2 | 8/2011 | Niewöhner et al. |
| 9,033,118 B2 | 5/2015 | Lee et al. |
| (Continued) | | |

FOREIGN PATENT DOCUMENTS

| EP | 1 907 338 B1 | 1/2013 |
| EP | 2 647 862 A2 | 10/2013 |
| (Continued) | | |

OTHER PUBLICATIONS

Bernardo, E., et al., "Advanced Ceramics from Preceramic Polymers Modified at the Nano-Scale: A Review", Materials, 2014, vol. 7, pp. 1927-1956.

(Continued)

*Primary Examiner* — Jeffrey M Wollschlager
*Assistant Examiner* — Xue H Liu
(74) *Attorney, Agent, or Firm* — One LLP

(57) ABSTRACT

Systems, devices, and methods are provided for manufacturing a carbon ceramic brake disc. Generally, a plurality of uncured or partially-cured bulk molding compound preforms or molding compound layers and ventilation cores are placed in a mold cavity and warm-pressed at a first temperature. The ventilation cores are removed from the resulting cured green body. The cured green body is then removed from the mold, and treated through a polymer infiltration and pyrolysis or reactive melt infiltration process. Certain steps can be repeated until a desired target density or weight is attained.

16 Claims, 11 Drawing Sheets

(51) Int. Cl.
*F16D 69/02* (2006.01)
*C04B 35/657* (2006.01)
*C04B 41/00* (2006.01)
*F16D 65/12* (2006.01)
*C04B 35/571* (2006.01)
*C04B 35/83* (2006.01)
*C04B 35/626* (2006.01)
*B32B 18/00* (2006.01)
*F16D 65/02* (2006.01)

(52) U.S. Cl.
CPC ...... *C04B 35/6267* (2013.01); *C04B 35/6269* (2013.01); *C04B 35/65* (2013.01); *C04B 35/657* (2013.01); *C04B 35/83* (2013.01); *C04B 41/009* (2013.01); *F16D 65/126* (2013.01); *F16D 65/127* (2013.01); *F16D 65/128* (2013.01); *F16D 69/023* (2013.01); *C04B 2235/3826* (2013.01); *C04B 2235/428* (2013.01); *C04B 2235/48* (2013.01); *C04B 2235/483* (2013.01); *C04B 2235/5248* (2013.01); *C04B 2235/5272* (2013.01); *C04B 2235/5427* (2013.01); *C04B 2235/5436* (2013.01); *C04B 2235/604* (2013.01); *C04B 2235/6028* (2013.01); *C04B 2235/612* (2013.01); *C04B 2235/616* (2013.01); *C04B 2235/9669* (2013.01); *F16D 2065/132* (2013.01); *F16D 2065/1324* (2013.01); *F16D 2065/1328* (2013.01); *F16D 2065/1344* (2013.01); *F16D 2200/0047* (2013.01); *F16D 2200/0065* (2013.01); *F16D 2200/0086* (2013.01)

(58) Field of Classification Search
CPC ...... C04B 2235/483; C04B 2235/5248; C04B 2235/5772; C04B 2235/0628; C04B 2235/612; C04B 2235/616; C04B 2235/9669; F16D 69/023; F16D 2200/0047; F16D 2200/0065; F16D 2200/0086; B29C 43/006; B29C 43/18; B29C 71/02; B29C 70/545
USPC ......................................................... 264/29.1
See application file for complete search history.

(56) References Cited

U.S. PATENT DOCUMENTS

| 2002/0068164 | A1 | 6/2002 | Martin |
| 2006/0070831 | A1 | 4/2006 | Reulein et al. |
| 2009/0223756 | A1 | 9/2009 | Rosenlocher |
| 2010/0000831 | A1 | 1/2010 | Faria et al. |
| 2012/0168267 | A1 | 7/2012 | Lee et al. |
| 2013/0248305 | A1 | 9/2013 | Choi et al. |
| 2015/0082850 | A1 | 3/2015 | Flores et al. |
| 2016/0025167 | A1 | 1/2016 | Broda et al. |

FOREIGN PATENT DOCUMENTS

| EP | 2 647 863 A1 | 10/2013 |
| WO | WO 2008/093091 A1 | 8/2008 |
| WO | WO 2009/037437 A1 | 3/2009 |
| WO | WO 2012/066352 A1 | 5/2012 |
| WO | WO 2012/089838 A1 | 7/2012 |
| WO | WO 2013/110909 A1 | 8/2013 |
| WO | WO 2014/068046 A1 | 5/2014 |

OTHER PUBLICATIONS

Dhananjayan, V. K., "Design and Analysis of a Compression Molded Carbon Composite Wheel Center", The University of Texas at Arlington, 2013, pp. 1-91.

Howell, D. D. et al., "Compression Molding of Long Chopped Fiber Thermoplastic Composites", CAMX Conference Proceedings, 2016, Orlando, FL, pp. 1-7.

Krenkel, W., et al., "Ceramic Matrix Composites for High Performance Friction Applications", Proceedings of the IV Advanced Ceramics and Applications Conference, 2017, pp. 13-28.

Lukacs, III, A., "Polysilazane Precursors to Advanced Ceramics", American Ceramic Society Bulletin, 2006, vol. 86, No. 1, pp. 9301-9306.

SYSTEMS, DEVICES, AND METHODS FOR MANUFACTURING CARBON CERAMIC BRAKE DISCS

CROSS-REFERENCE TO RELATED APPLICATIONS

This application claims the benefit of and priority to U.S. Provisional Application Ser. No. 62/615,735, filed Jan. 10, 2018, which is incorporated by reference herein in its entirety for all purposes.

FIELD

The subject matter described herein relates generally to systems, devices, and methods for manufacturing carbon ceramic brake discs. In particular, described herein are embodiments of carbon ceramic brake discs with friction layers, structural layers and ventilation shafts produced according to the methods and devices disclosed herein.

BACKGROUND

As a matter of safety and control, braking systems have long been a focus of research and development in a wide variety of transportation-related fields. Despite their importance, however, advances in automotive braking systems have come about as part of a gradual evolution. Mechanical drum brakes, for example, which were developed in the early 1900s and considered primitive by today's standards, were not replaced by disc brakes until the 1960s. Even with technological advances in engineering and design, such as with anti-lock braking systems, most production vehicles still utilize brakes manufactured from grey cast iron.

Carbon ceramic brake discs, which were introduced in the late 1990s, offer several advantages over conventional cast iron brake discs. First, carbon ceramic brake discs are significantly lighter—weighing up to fifty percent less than their cast iron counterparts. Second, carbon ceramic brakes offer improved brake response, high thermal stability, high abrasion resistance, and longer life. They are more resistant to deformation or warping at high temperatures and, unlike cast iron brakes, do not corrode even when in contact with water or salt during the winter seasons.

Despite these advantages and several others, however, carbon ceramic brake discs have failed to achieve wide adoption outside of high-end performance vehicles and other specialized areas, such as with aircraft and the aerospace industry. One reason is that known processes for manufacturing carbon ceramic brake discs can be time-consuming, costly, and require expensive equipment. As one example, according to one published process utilized by a well-known manufacturer, it can take over twenty days to produce a single carbon ceramic brake disc.

Thus, needs exist for systems, devices and methods for efficiently and effectively manufacturing carbon ceramic brake discs.

SUMMARY

Provided herein are example embodiments of systems, devices and methods for manufacturing carbon ceramic brake discs. According to one aspect of the embodiments, a plurality of uncured or partially-uncured bulk molding compound ("BMC") preforms and a plurality of ventilation cores can be placed into the cavity of a mold, wherein the plurality of BMC preforms can include a pair of preform layers comprising a first BMC formulation and at least one structural preform comprising a second BMC formulation. In many of the embodiments described herein, the preform layers can each comprise an annular shape, and the one or more structural preforms and the ventilation cores can be disposed between the pair of uncured preform layers, wherein each of the ventilations cores is adjacent to an uncured structural perform. The plurality of BMC preforms are then press-molded in the mold at a first predetermined temperature and at a predetermined pressure to form a cured green body. The ventilation cores can then be removed from the cured green body and, subsequently, the cured green body can be placed in a vacuum chamber and infiltrated with a liquid polymer to form a polymer-infiltrated body. The polymer-infiltrated body can then be pyrolyzed in an inert atmosphere at a second predetermined temperature to form a pyrolyzed body.

In many of the embodiments disclosed herein, optionally, a thin layer can be shaved from the cured green body prior to the polymer infiltration and pyrolysis steps. Subsequently, a physical characteristic of the pyrolyzed body can be measured to determine whether it is within a target parameter range. In some embodiments, for example, the physical characteristic can be a weight or a density of the pyrolyzed body. If the pyrolyzed body is not within the target parameter range, the pyrolyzed body can be placed into the vacuum chamber, infiltrated with liquid polymer, pyrolyzed in the inert atmosphere at the second predetermined temperature, and measured again until the pyrolyzed body is within the target parameter range.

According to another aspect of the embodiments, to facilitate ease-of-removal of the ventilation cores from the cured green body, each ventilation core can include a top surface, a bottom surface, a first side surface, and a second side surface, wherein the surfaces can form a plurality of tapered edges. In many of the embodiments, each ventilation core can also include one or more pins configured to secure the ventilation core during press-molding and to facilitate removal of the ventilation core from the cured green body.

In some embodiments, each ventilation core can further comprise a pair of side portions with a removable center portion disposed therebetween. According to one aspect of the embodiments, the side portions can be joined by a biasing element, wherein the side portions are biased to flexibly collapse toward each other upon removal of the center portion.

In still other embodiments, each ventilation core can further comprise a first side surface having an inwardly curved (e.g., concave) surface and a second side surface having an outwardly curved (e.g., convex) surface, wherein the curved surfaces are configured to mold the adjacent structural preforms such that curved ventilations shafts are left behind when the ventilation cores are removed from the cured green body.

In still other embodiments, a heating element, such as a heating coil, can be disposed within one or more ventilation cores, and configured to efficiently heat at least a portion of the mold cavity during press-molding.

According to other example embodiments of systems, devices, and methods for manufacturing carbon ceramic brakes, a first and a second dry molding compound ("DMC") formulation can be utilized for, respectively, the frictional and structural layers of a carbon ceramic brake disc, instead of, or in combination with, the aforementioned bulk molding compound formulations.

According to still other example embodiments of systems, devices, and methods for manufacturing carbon ceramic brakes, a reactive melt infiltration ("RMI") process with a plurality of BMC or DMC formulations can be utilized to manufacture carbon ceramic brakes. In some embodiments, for example, a plurality of molding compound (e.g., BMC and/or DMC) layers and a plurality of ventilation cores can be placed into the cavity of a mold, wherein the plurality of molding compound layers can include one or more friction layers comprising a first molding compound formulation and at least one structural layer comprising a second molding compound formulation. In many of the embodiments described herein, at least the one or more friction layers can comprise an annular shape, and the one or more structural layers and the ventilation cores can be disposed between the friction layers, wherein each of the ventilations cores is adjacent to a structural layer. The plurality of molding compound layers is then press-molded in the mold at a first predetermined temperature and at a first predetermined pressure to form a cured green body. The ventilation cores can then be removed from the cured green body and, subsequently, the cured green body is pyrolyzed in an inert atmosphere at a second predetermined temperature to form a pyrolyzed body. The pyrolyzed body is subsequently placed in a vacuum furnace with fine silicon powder and heated in an inert atmosphere with a negative pressure to a third predetermined temperature to form a silicon-infiltrated body. According to another aspect of the embodiments, the silicon-infiltrated body can then be machined to finish and, optionally, coated with an anti-oxidation coating and polished to form a finished body. In some embodiments, the finished body can be scanned for defects using an ultrasonic or x-ray device.

The various configurations of these systems, methods and devices are described by way of the embodiments which are only examples. Other systems, devices, methods, features, improvements and advantages of the subject matter described herein are or will become apparent to one with skill in the art upon examination of the following figures and detailed description. It is intended that all such additional systems, devices, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

DETAILED DESCRIPTION

Figure 1:
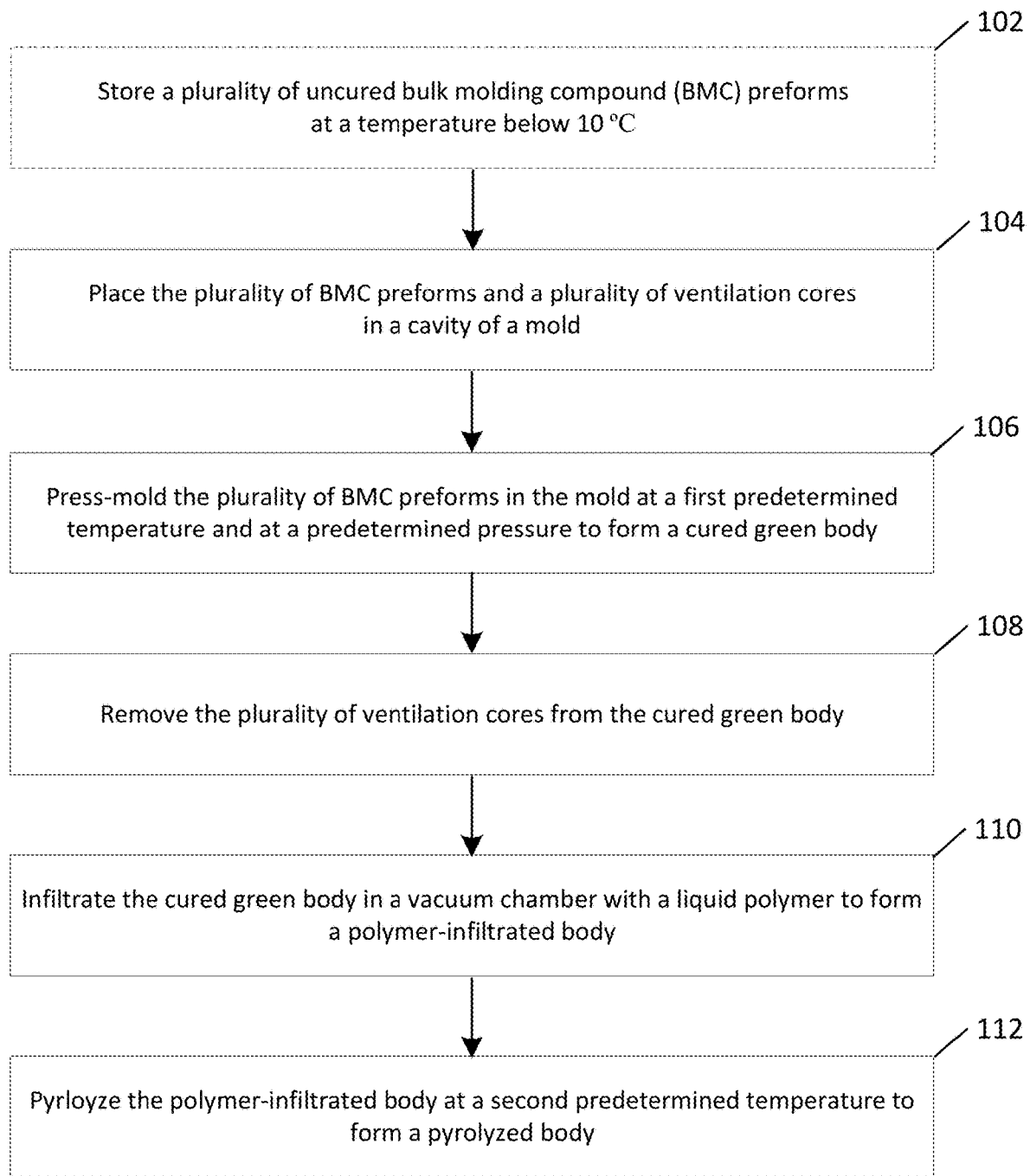
FIG. 1 is a flow chart diagram depicting an example embodiment method for manufacturing carbon ceramic brake discs.

Before the present subject matter is described in detail, it is to be understood that this disclosure is not limited to the particular embodiments described herein, as such may, of course, vary. It is also to be understood that the terminology used herein is for the purpose of describing particular embodiments only, and is not intended to be limiting, since the scope of the present disclosure will be limited only by the appended claims.

As used herein and in the appended claims, the singular forms "a," "an," and "the" include plural referents unless the context clearly dictates otherwise.

Generally, embodiments of the present disclosure include systems, devices, and methods for manufacturing a carbon ceramic brake disc comprising a silicon-carbide-ceramic or silicon-oxycarbide-ceramic material, through the use of polymer infiltration and pyrolysis ("PIP"). Accordingly, many of the method embodiments include the steps of placing a plurality of uncured or partially-cured thermoset bulk molding compound ("BMC") preforms and a plurality of ventilation cores into the cavity of a mold, wherein the plurality of BMC preforms can include a pair of preform layers (e.g., friction layers) comprising a first BMC formulation and at least one structural preform (e.g., structural layers) comprising a second BMC formulation.

In many of the embodiments, the first BMC formulation can comprise a phenolic resin mixture with chopped or discontinuous carbon fibers (also known as carbon staple fibers), wherein each carbon staple fiber can have an average length preferably in a range between 5 millimeters (mm) and 30 mm, and no longer than 51 mm. In other embodiments, milled carbon fibers having an average length of 100 microns or greater can be used. The second BMC formulation can similarly comprise a phenolic resin mixture, characterized by a different percentage-mass or average length of carbon staple fiber relative to the first BMC formulation. In some embodiments, for example, the second BMC formulation can include carbon staple fibers each having a greater average length than those of the first BMC formulation, but not exceeding 51 mm in average length, to provide for greater strength.

According to other example embodiments of systems, devices, and methods for manufacturing carbon ceramic brakes, a dry molding compound ("DMC"), can be utilized instead of, or in combination with, a BMC.

According to other example embodiments of systems, devices, and methods for manufacturing carbon ceramic brakes, a reactive melt infiltration ("RMI") process with a plurality of BMC or DMC formulations can be utilized to manufacture carbon ceramic brakes. In some embodiments, for example, a plurality of molding compound (e.g., BMC and/or DMC) layers and a plurality of ventilation cores can be placed into the cavity of a mold, wherein the plurality of molding compound layers can include one or more friction layers comprising a first molding compound formulation and at least one structural layer comprising a second molding compound formulation. In many of the embodiments described herein, at least the one or more friction layers can comprise an annular shape, and the one or more structural layers and the ventilation cores can be disposed between the friction layers, wherein each of the ventilations cores is adjacent to a structural layer. The plurality of molding compound layers is then press-molded in the mold at a first predetermined temperature and at a first predetermined pressure to form a cured green body. The ventilation cores can then be removed from the cured green body and, subsequently, the cured green body is pyrolyzed in an inert atmosphere at a second predetermined temperature to form a pyrolyzed body. The pyrolyzed body is subsequently placed in a vacuum furnace with fine silicon powder and heated in an inert atmosphere with a negative pressure to a third predetermined temperature to form a silicon-infiltrated body. According to another aspect of the embodiments, the silicon-infiltrated body can then be machined to finish and, optionally, coated with an anti-oxidation coating and polished to form a finished body. In some embodiments, the finished body can be scanned for defects using an ultrasonic or x-ray device.

Additionally, embodiments of the present disclosure also include ventilation cores for use in manufacturing carbon ceramic brake discs. According to one aspect of the embodiments, to facilitate ease-of-removal from the cured green body after compression molding, a ventilation core can include a plurality of surfaces that can form tapered edges. Furthermore, in some embodiments, each ventilation core can further comprise a pair of side portions with a removable center portion disposed therebetween. According to another aspect of the embodiments, the side portions can be joined by a biasing element, wherein the side portions are biased to flexibly collapse toward each other upon removal of the center portion.

In still other embodiments, each ventilation core can further comprise a first side surface having an inwardly curved (e.g., concave) surface and a second side surface having an outwardly curved (e.g., convex) surface, wherein the curved surfaces are configured to mold the adjacent structural preforms such that curved ventilations shafts are left behind when the ventilation cores are removed. In still other embodiments, a heating element, such as a heating coil, can be disposed within one or more ventilation cores, and configured to efficiently heat at least a portion of the mold cavity during press-molding.

For each and every embodiment of a method disclosed herein, systems and devices capable of performing each of those embodiments are covered within the scope of the present disclosure. For example, embodiments of various "in-mold configurations" and ventilation cores are disclosed, and these embodiments can each have one or more features that can be implemented, either individually or in combination with one another, according to any and all of the method steps disclosed herein.

Example Method Embodiments for Manufacturing a Carbon Ceramic Brake Disc

Example embodiments of methods for manufacturing carbon ceramic brake discs will now be described. Generally, the embodiment methods disclosed herein include positioning a plurality of uncured or partially-cured bulk molding compound ("BMC") preforms, along with ventilation cores, into a mold cavity. The uncured BMC preforms can be stored at a low temperature for a period of months allowing for a more efficient management of "raw material" inventory. Subsequently, the plurality of uncured or partially-cured BMC preforms are warm-pressed in the mold to form a cured green body. Thereafter, the ventilation cores are removed, and the cured green body is subjected to liquid polymer infiltration and pyrolysis to reach the final product.

Referring to FIG. 1, a flow diagram is provided, depicting an example embodiment of a method 100 for manufacturing carbon ceramic brake discs. As shown by the dashed outline, at Step 102, a plurality of uncured or partially-cured bulk molding compound ("BMC") preforms can be optionally stored at a temperature below 10° C. At Step 104, the plurality of BMC preforms and a plurality of ventilation cores are placed in a cavity of a mold, such as described with respect to FIGS. 3A, 4A, and 5A below, wherein the plurality of BMC preforms include a pair of preform layers (e.g., friction layers) comprising a first BMC formulation and at least one structural preform (e.g., structural layer) comprising a second BMC formulation.

In many of the embodiments, the first BMC formulation can comprise a phenolic resin mixture with chopped or discontinuous carbon fibers (also known as carbon staple fibers). In some embodiments, for example, the first BMC formulation can comprise 40% to 80% carbon staple fibers by mass, with each carbon staple fiber having an average length less than 51 millimeters (mm), preferably in a range between 5 mm to 30 mm. In other embodiments, milled carbon fibers having an average length of 100 microns or greater can be used. The first BMC formulation can further comprise up to 1% of polymers, and 20% to 60% of binders, preferably selected from thermoset resins and pitches and mixtures thereof, which produce a yield of at least 50% of their original mass of carbon if heated in an inert atmosphere to temperatures of 800° C. to 1300° C., preferably phenolic resins or mixtures of phenolic resins having a proportion by weight of up to 40% of pitches in the mixtures. In some embodiments, for example, the resin can comprise polyvinyl alcohol. Those of skill in the art will understand that other resins can be utilized with respect to the BMC formulation, and are fully within the scope of the present disclosure.

The second BMC formulation can similarly comprise a phenolic resin mixture, characterized by a different percentage-mass or average length of carbon staple fibers relative to the first BMC formulation. In some embodiments, for example, the second BMC formulation can include carbon staple fibers each having a greater average length than those of the first BMC formulation, but not exceeding 51 mm in average length, to provide for greater strength. The second BMC formulation can also comprise a lower percentage-mass of carbon staple fibers relative to the first BMC formulation. Conversely, the first BMC formulation can include carbon staple fibers each having a shorter average length relative to the second BMC formulation, as well as a higher percentage-mass of carbon staple fibers, to provide for a denser and less porous surface, which has been shown to extend the life of the brake rotor and the brake pads.

Those of skill in the art will appreciate that other non-methane organic compounds can be used for either of the first or second BMC formulations, and are fully within the scope of the present disclosure.

Referring still to FIG. 1, at Step 106, the mold is closed and the plurality of BMC preforms are warm-pressed or press-molded in the mold at a first predetermined temperature and at a predetermined pressure to form a cured green body. The first predetermined temperature can range between 140° C. to 200° C., with the predetermined pressure ranging from 5 MPa to 25 MPa.

At Step 108, the cured green body is removed from the mold and the plurality of ventilation cores are removed from the cured green body. Optionally, in some embodiments, a plurality of ventilation holes can be drilled into the cured green body (as shown in FIG. 7A). In other embodiments, a thin layer can optionally be shaved from at least a portion of the cured green body in preparation for the subsequent steps. In some embodiments, for example, a layer having a thickness within a range of 0.2 mm to 1 mm can be shaved from each of the BMC preform layers (i.e., friction layers).

At Step 110, the cured green body is placed in a vacuum chamber and infiltrated with a liquid polymer to form a polymer-infiltrated body. The liquid polymer can comprise a low-viscosity polymer such as polysilazane, polycarbosilanes, polymethylsilane, allhyrdidopolycarbosilane, or any other preceramic polymer, as will be appreciated by those of skill in the art. In many of the embodiments disclosed herein, the vacuum chamber can comprise a room temperature environment.

At Step 112, the polymer-infiltrated body is pyrolyzed in a non-oxidative or inert atmosphere at a second predetermined temperature to form a pyrolyzed body. According to one aspect of the disclosed embodiments, the second predetermined temperature can range from 800° C. to 1300° C., and the inert atmosphere can comprise an argon or nitrogen gas. Those of skill in the art will appreciate, however, that other gases can be utilized and are fully within the scope of the present disclosure. Following pyrolysis, the pyrolyzed body can be removed and machined using a three-axis or five-axis CNC (Computer numerical control) machine to remove any blemishes on the carbon ceramic brake disc. In some embodiments, a protective coating of paint can also be applied to the pyrolyzed body to prevent oxidation of the carbon ceramic brake disc.

Figure 2:
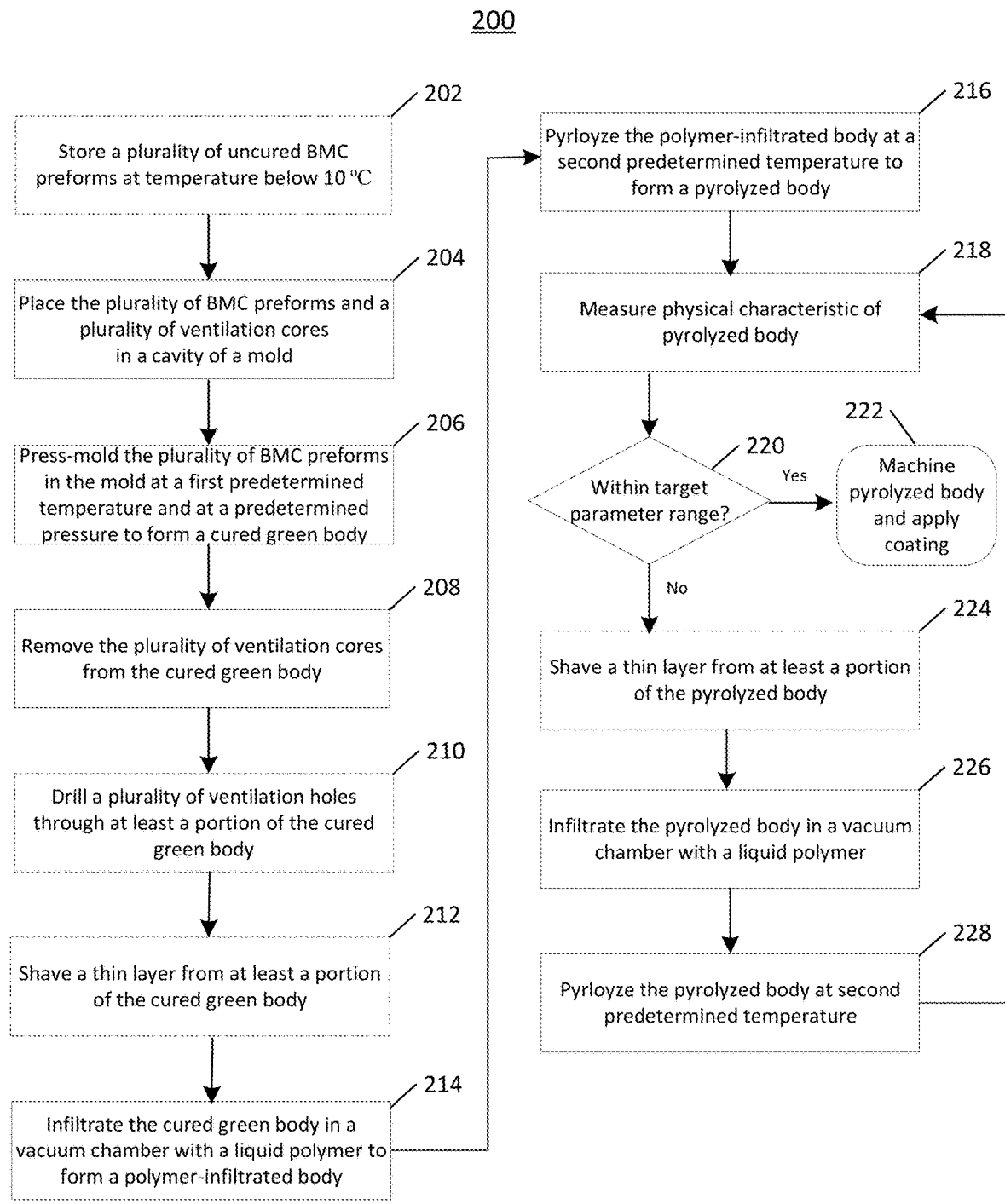
FIG. 2 is a flow chart diagram depicting another example embodiment method for manufacturing carbon ceramic brake discs.

Turning to FIG. 2, a flow diagram is provided, depicting another example embodiment of a method 200 for manufacturing carbon ceramic brake discs. In several aspects, method 200 is similar to method 100. For example, at Step 202, as indicated by the dashed outline, a plurality of uncured or partially-cured BMC preforms can be optionally stored at a temperature below 10° C. At Step 204, the plurality of BMC preforms and a plurality of ventilation cores are placed in a cavity of a mold, wherein the plurality of BMC preforms include a pair of preform layers (e.g., friction layers) comprising a first BMC formulation and at least one structural preform (e.g., structural layer) comprising a second BMC formulation. The first and second BMC formulations can comprise the materials, respectively, as those described with respect to method 100 of FIG. 1.

At Step 206, the mold is closed, and the plurality of BMC preforms are warm-pressed at a first predetermined temperature and at a predetermined pressure to form a cured green body. The first predetermined temperature and predetermined pressure can comprise the same range of values as those described with respect to method 100 of FIG. 1.

At Step 208, the cured green body is removed from the mold and the plurality of ventilation cores are removed from the cured green body. Optionally, in some embodiments, at Step 210, a plurality of ventilation holes can be drilled into the cured green body as shown in FIG. 7A). In other embodiments, at Step 212, a thin layer can optionally be shaved from at least a portion of the cured green body in preparation for the subsequent steps. In some embodiments, for example, a layer having a thickness within a range of 0.2 mm to 1 mm can be shaved from each of the BMC preform layers (i.e., friction layers).

At Step 214, the cured green body is placed in a vacuum chamber and infiltrated with a liquid polymer to form a polymer-infiltrated body, wherein the liquid polymer can comprise the same low-viscosity preceramic polymers described with respect to method 100 of FIG. 1. In many of the embodiments disclosed herein, the vacuum chamber can comprise a room temperature environment.

At Step 216, the polymer-infiltrated body is pyrolyzed in a non-oxidative or inert atmosphere at a second predetermined temperature to form a pyrolyzed body. The second predetermined temperature can comprise the same range of values as those described with respect to method 100 of FIG. 1.

At Step 218, a physical characteristic of the pyrolyzed body can be measured, wherein the physical characteristic can be one or more of a weight of the pyrolyzed body, a density of the pyrolyzed body, or a porosity of the pyrolyzed body. In some embodiments, the physical characteristics can be measured by one or more of a scale, an X-ray machine or an ultrasound machine.

At Step 220, the physical characteristic is compared to a target parameter. According to one aspect of the embodiments disclosed herein, if it is determined that the physical characteristic is within the target parameter range, then at Step 222, the pyrolyzed body can be removed and machined using a three-axis or five-axis CNC (Computer numerical control) machine to remove any blemishes on the carbon ceramic brake disc. In some embodiments, a protective coating of paint can also be applied to the pyrolyzed body to prevent oxidation of the carbon ceramic brake disc.

According to another aspect of the embodiments disclosed herein, if it is determined that the physical characteristic is not within the target parameter range, then at Step 224, a thin layer can optionally be shaved from at least a portion of the pyrolyzed body. In some embodiments, for example, a layer having a thickness within a range of 0.2 mm to 1 mm can be shaved from the friction layers. At Step 226, the pyrolyzed body is placed back into a vacuum chamber and infiltrated with the liquid polymer. In many of the embodiments disclosed herein, the vacuum chamber can comprise a room temperature environment. At Step 228, they polymer-infiltrated/pyrolyzed body is again pyrolyzed in a non-oxidative atmosphere at the second predetermined temperature. The pyrolyzed body is measured again to determine whether the physical characteristic is within the target parameter range. If the measured physical characteristic is within the target parameter range, the pyrolyzed body can be removed, machined, and optionally coated with a protective coating, as described with respect to Step 222. If the measured physical characteristic is not within the target parameter range, then Step 224 (optionally), Step 226, and Step 228 are repeated until the target parameter range is reached.

According to one aspect of the embodiments, the target parameter range can include a target weight range, a target mass range, a target density range, a target porosity range, a target change in weight range (absolute or by percentage), a target change in mass range (absolute or by percentage), a target change in density range (absolute or by percentage), a target change in porosity range (absolute or by percentage), or a combination thereof. Those of skill in the art will also appreciate that the target parameter range can vary depending on the particular application of the carbon ceramic brake disc, and that the various target parameter ranges are fully within the scope of the present disclosure.

Additionally, although many of the embodiments and related figures of the present disclosure are described using a bulk molding compound ("BMC"), any of the example embodiment systems, devices, and methods described herein can be implemented using a dry molding compound ("DMC") either instead of the BMC, or in combination with the BMC. In many embodiments, for example, the DMC can comprise a fine powder or a milled powder having a particle size between 1 and 200 microns.

Figure 9:
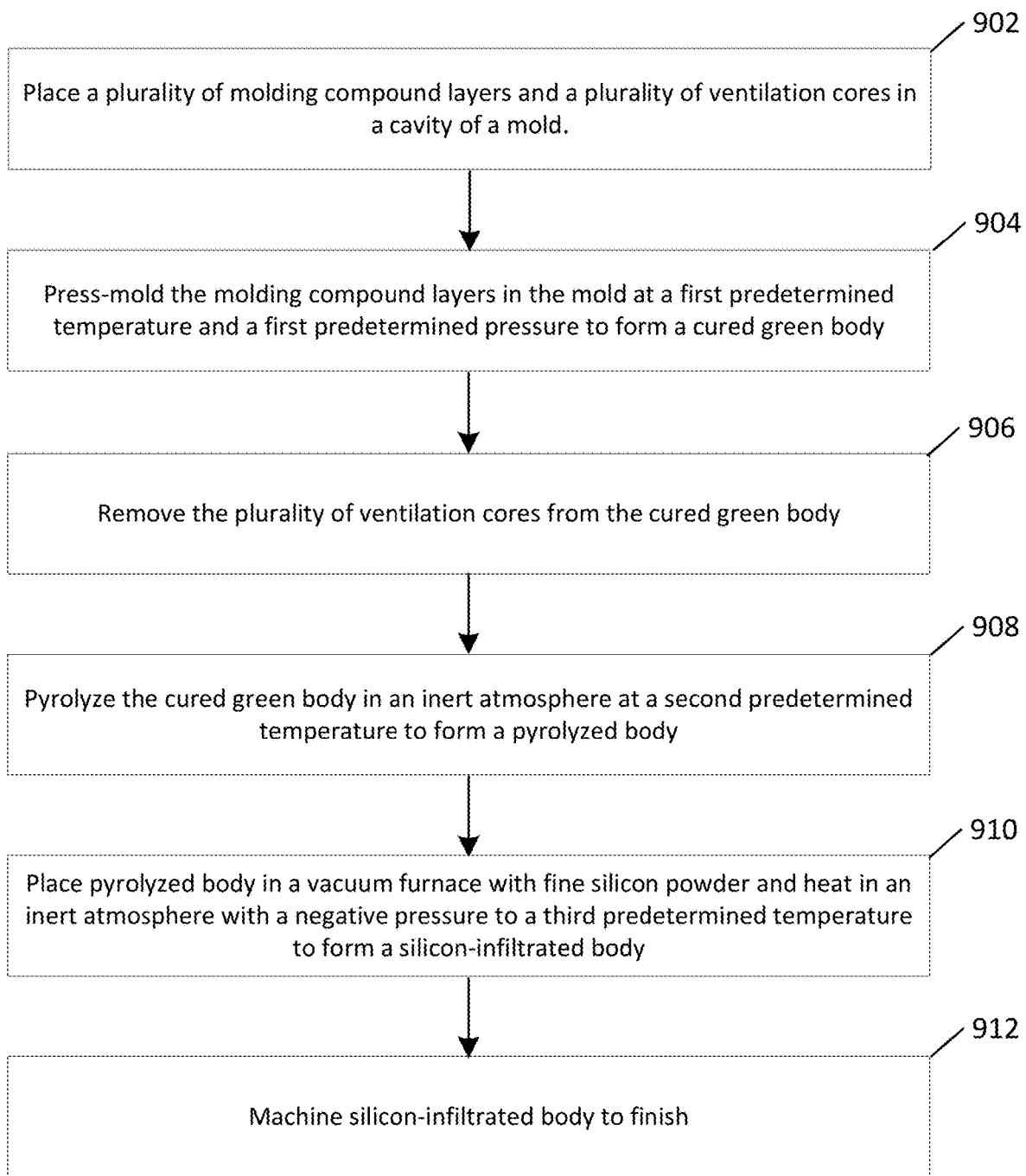
FIG. 9 is a flow chart diagram depicting another example embodiment method for manufacturing carbon ceramic brake discs.

Furthermore, although many of the embodiments and related figures of the present disclosure are described utilizing a ("PIP") process, any of the example embodiment systems, devices, and methods described herein can be implemented utilizing a reactive melt infiltration ("RMI") process. FIG. 9 is a flow chart depicting another example embodiment of a method 900 for manufacturing carbon ceramic brake discs. At Step 902, a plurality of molding compound layers and a plurality of ventilation cores are placed in a cavity of a mold, such as those described with respect to FIGS. 3A, 4A, and 5A below. According to one aspect of the embodiments, the molding compound layers can comprise a bulk molding compound, a dry molding compound, or a combination thereof. According to another aspect of the embodiments, the plurality of molding compound layers can include a pair of friction layers comprising a first molding compound formulation, and one or more structural molding compound layers comprising a second molding compound formulation. The first molding compound formulation can comprise a phenolic resin mixture that is 40% to 80% carbon staple fibers by mass and can include the same or similar characteristics to the phenolic resin mixture described with respect to FIGS. 1 and 2. The second molding compound formulation can comprise a phenolic resin mixture, characterized by a different percentage-mass or average length of carbon staple fibers relative to the first molding compound formulation. In some embodiments, for example, the second molding compound formulation can include carbon staple fibers each having a greater average length than those of the first molding compound formulation, but not exceeding 51 mm in average length, to provide for greater strength. The second molding compound formulation can also comprise a lower percentage-mass of carbon staple fibers relative to the first molding compound formulation. Conversely, the first molding compound formulation can include carbon staple fibers each having a shorter average length relative to the second molding compound formulation, as well as a higher percentage-mass of carbon staple fibers, to provide for a denser and less porous surface, which has been shown to extend the life of the brake rotor and the brake pads. Those of skill in the art will appreciate that other non-methane organic compounds can be used for either of the first or second molding compound formulations and are fully within the scope of the present disclosure.

Referring still to FIG. 9, at Step 904, the mold is closed and the plurality of molding compound layers are warm-pressed or press-molded in the mold at a first predetermined temperature and at a first predetermined pressure to form a cured green body. The first predetermined temperature can range between 250° F. to 400° F., with the first predetermined pressure ranging from 5 MPa to 25 MPa.

At Step 906, the cured green body is removed from the mold and the plurality of ventilation cores are removed from the cured green body. Optionally, in some embodiments, a plurality of ventilation holes can be drilled into the cured green body (as shown in FIG. 7A). In other embodiments, a thin layer can optionally be shaved from at least a portion of the cured green body in preparation for the subsequent steps. In some embodiments, for example, a layer having a thickness within a range of 0.2 mm to 1 mm can be shaved from each of the BMC preform layers (i.e., friction layers).

At Step 908, the cured green body is pyrolyzed in an inert atmosphere at a second predetermined temperature to form a pyrolyzed body. According to some embodiments, the pyrolyzing step can be performed in a retort oven. The second predetermined temperature can range from 800° C. to 1300° C. In some embodiments, the inert atmosphere can comprise an inert gas such as, for example, an argon or nitrogen gas. Those of skill in the art will appreciate, however, that other gases can be utilized and are fully within the scope of the present disclosure.

At Step 910, the pyrolyzed body is removed from the oven and placed in a vacuum furnace. Subsequently, a fine silicon powder is poured on the pyrolyzed body and heated in an inert atmosphere with a negative pressure to a third predetermined temperature to form a silicon-infiltrated body. According to one aspect of the embodiments, the third predetermined temperature can range between 1450° C. to 2100° C., at which the silicon powder melts and reacts with the carbon to form silicon carbide. In addition, an inert atmosphere can be created by pumping an inert gas such as, for example, an argon or nitrogen gas into the vacuum furnace. According to another aspect of the embodiments, the vacuum furnace can be configured to create a negative pressure of at least 0.5 Torr.

At Step 912, the silicon-infiltrated body is removed from the vacuum furnace and machined to finish. For example, according to some embodiments, a plurality of holes configured to receive bolts can be bored out of the silicon-infiltrated body. In some embodiments, surface grinding and polishing can be performed on the silicon-infiltrated body, which can also be coated with an anti-oxidation coating, as described earlier with respect to FIGS. 1 and 2. In some embodiments, the finished body can also be scanned for defects using, for example, an ultrasonic or x-ray device.

Example Embodiments of In-Mold BMC Preform and Ventilation Core Configurations

Example embodiments of various uncured or partially-cured BMC preforms and ventilation cores, as positioned in various configurations in a mold cavity, will now be described. Those of skill in the art will understand that the embodiments described herein can be implemented as part of the example method embodiments described above with respect to FIGS. 1, 2, and 9.

Figure 3B:
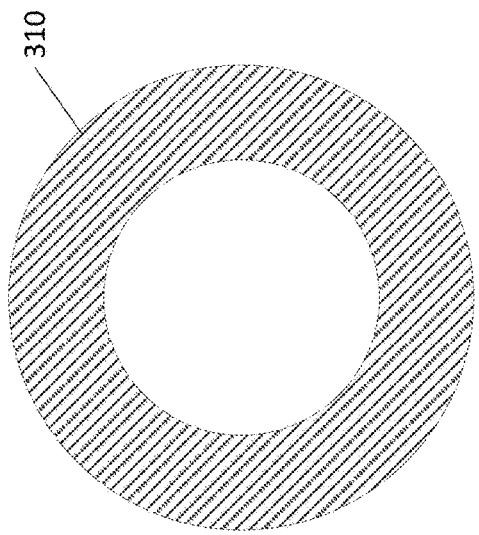
FIG. 3B is a top-down view of an example embodiment of a BMC preform layer.
Figure 3C:
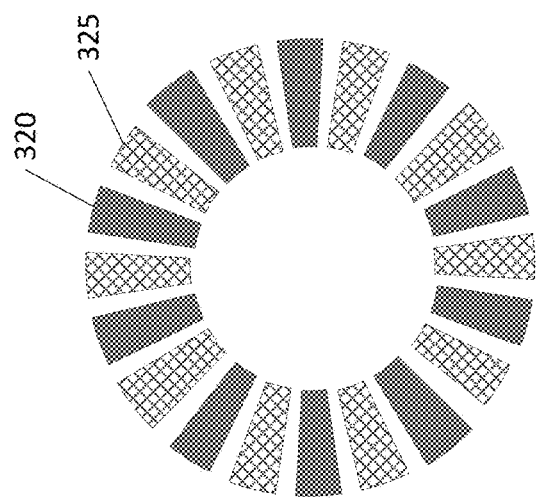
FIG. 3C is a top-down view of an example embodiment comprising a plurality of BMC structural preforms and ventilation cores.
Figure 3A:
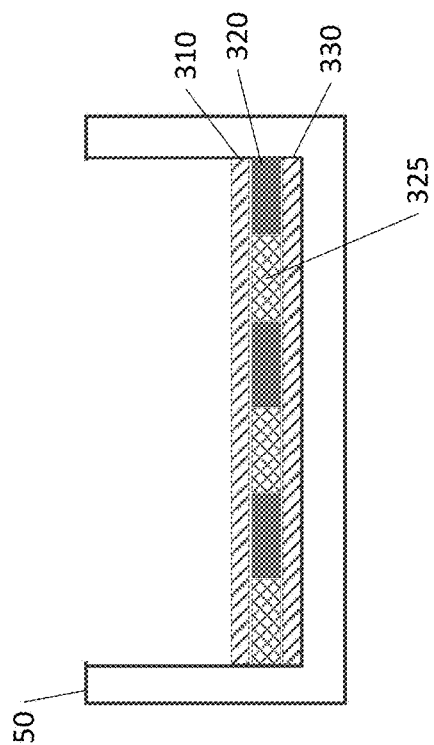
FIG. 3A is a cross-sectional view depicting one aspect of an example embodiment method, comprising a plurality of BMC preforms and ventilation cores in a mold cavity.

Turning to FIG. 3A, a cross-sectional view depicting one aspect of an example embodiment method is provided, wherein the embodiment comprises a plurality of uncured of partially-cured BMC preforms and ventilation cores in a cavity of a mold 50, such as that described with respect to Step 104 of method 100 (see FIG. 1) and Step 204 of method 200 (see FIG. 2), respectively. According to one aspect of the embodiment, a pair of uncured or partially-cured BMC preform layers, comprising a top preform layer 310 and a bottom preform layer 330, are positioned in mold 50. In many of the embodiments, uncured or partially-cured BMC preform layers can comprise a first BMC formulation, and can serve as friction layers for a carbon ceramic brake disc. As previously described with respect to FIG. 1, the first BMC formulation can comprise 40% to 80% carbon staple fibers by mass, with each carbon staple fiber having an average length less than 51 mm, preferably within a range between 5 mm to 30 mm. In some embodiments, the first BMC formulation can further comprise up to 1% of polymers, and 20% to 60% of binders, preferably selected from thermoset resins and pitches and mixtures thereof, and preferably phenolic resins or mixtures of phenolic resins having a proportion by weight of up to 40% of pitches in the mixtures.

According to one aspect of the embodiments, the thickness of each uncured BMC preform layer is preferably in a range from 0.05 mm to 0.25 mm. Those of skill in the art will appreciate that the thickness of each friction layer can vary depending on the particular application or requirements of the carbon ceramic brake disc and, as such, other thicknesses either less than 0.05 mm or greater than 0.25 mm are fully within the scope of the present disclosure. For example, if it is determined that the first BMC formulation wears at 0.000005 mm per mile, and is required to last 100,000 miles at 130 kg per m/sec$^2$, then the minimum thickness of each friction layer can be 0.25 mm.

According to another aspect of the embodiments, a plurality of ventilation cores 320 and at least one uncured or partially-cured structural preform 325 comprising a second BMC formulation can be positioned between the pair of uncured preform layers 310 and 330. As can be seen in FIGS. 3A and 3C, in some embodiments, each of the ventilation cores 320 can be positioned adjacent to an uncured structural preform 325 in an alternating fashion.

Turning to FIG. 3B, a top-down view of an example embodiment of an uncured or partially-cured BMC preform layer 310 is provided. According to one aspect of the embodiment, the uncured or partially-cured BMC preform layer 310 can comprise a first BMC formulation. Furthermore, according to another aspect of the embodiments, uncured or partially-cured BMC preform layer 310 can comprise a single body having an annular shape. In other embodiments, uncured or partially-cured BMC preform layer 310 can comprise multiple bodies such as, for example, two halves of an annular shape, or four quarters of an annular shape.

Turning to FIG. 3C, a top-down view is provided of an example embodiment of a plurality of uncured or partially-cured BMC structural preforms 325 and ventilation cores 320. According to one aspect of the embodiment, the uncured or partially-cured BMC structural preforms 325 can comprise a second BMC formulation. In some embodiments, each ventilation core 320 can be positioned adjacent to an uncured or partially-cured BMC structural preform 325, such as in an alternating manner, as shown. In other embodiments, however, other configurations are possible, such as positioning two, three or four uncured or partially-cured BMC structural preforms 325 between each pair of ventilation cores 320. Along the same lines, although FIG. 3C depicts a configuration having ten ventilation cores 320 and ten uncured structural preforms 325, those of skill in the art will appreciate that any number of ventilation cores 320 and uncured or partially cured BMC structural preforms 325 can be utilized, and are fully within the scope of the present disclosure.

Figure 4B:
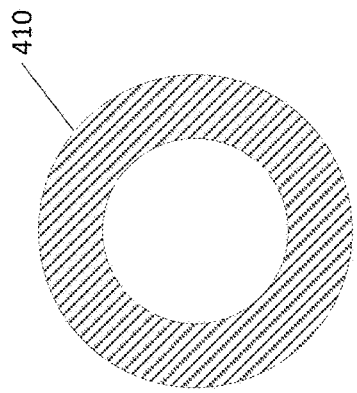
FIG. 4B is a top-down view of an example embodiment of a BMC preform layer.
Figure 4C:
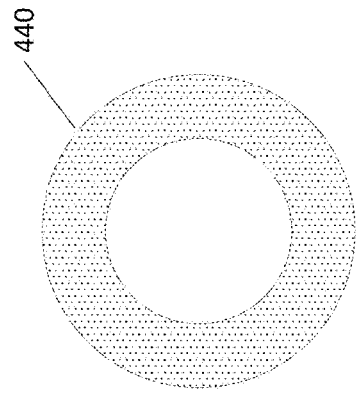
FIG. 4C is a top-down view of an example embodiment of a BMC structural preform.
Figure 4D:
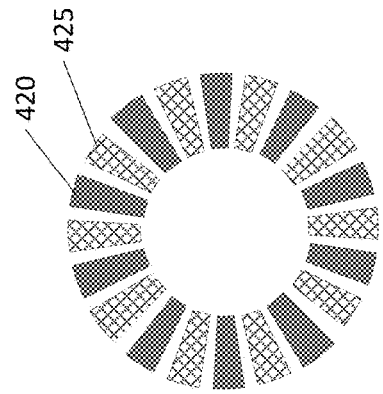
FIG. 4D is a top-down view of an example embodiment comprising a plurality of BMC structural preforms and ventilation cores.
Figure 4A:
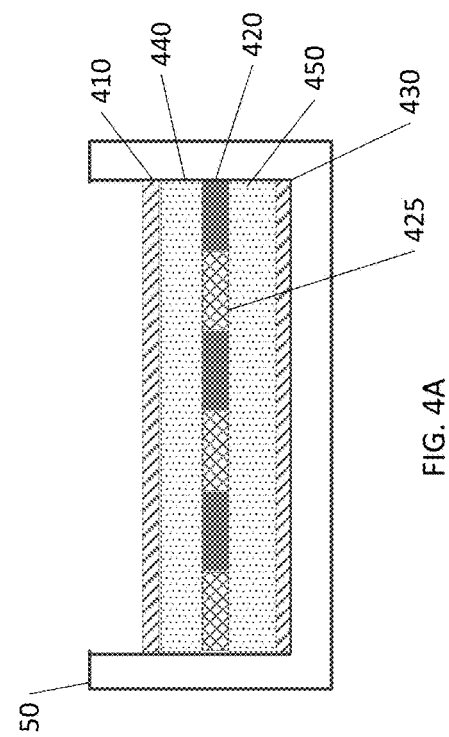
FIG. 4A is a cross-sectional view depicting another aspect of an example embodiment method, comprising a plurality of BMC preforms and ventilation cores in a mold cavity.

Turning to FIG. 4A, a cross-sectional view depicting one aspect of another example embodiment method is provided. According to one aspect of the embodiment, a pair of uncured or partially-cured BMC preform layers, comprising a top preform layer 410 and a bottom preform layer 430, is positioned in the cavity of mold 50, wherein the uncured or partially-cured BMC preform layers comprise a first BMC formulation, and can serve as friction layers for a carbon ceramic brake disc. Like the previous embodiment, a plurality of ventilation cores 420 and at least one uncured or partially-cured structural preform 425 comprising a second BMC formulation can be positioned between the pair of uncured or partially-cured preform layers 410 and 430. As can be seen in FIGS. 4A and 4D, in some embodiments, each of the ventilation cores 420 can be positioned adjacent to an uncured structural preform 425 in an alternating fashion.

Referring still to FIG. 4A, according to another aspect of the embodiment, a structural preform layer 440 comprising a third BMC formulation is positioned between top preform layer 410, and the plurality of ventilation cores 420 and at least one uncured or partially-cured structural preform 425. Similarly, another structural preform layer 450, also comprising the third BMC formulation, can be positioned between bottom preform layer 430, and the plurality of ventilation cores 420 and the at least one uncured or partially-cured structural preform 425. In many embodiments, the third BMC formulation can comprise a phenolic resin mixture, characterized by a different percentage-mass or average length of carbon staple fibers relative to the first BMC formulation. In some embodiments, for example, the third BMC formulation can include carbon staple fibers each having a greater average length than those of the first BMC formulation, but not exceeding 51 mm in average length, to provide for greater strength. According to another aspect of the disclosed embodiments, the third BMC formulation can include carbon staple fibers each having a greater average length than those of the second BMC formulation, but not exceeding 51 mm in average length. In other embodiments, however, the third BMC formulation can include carbon staple fibers having a smaller average length than those of the second BMC formulation but not exceeding 51 mm in average length. In still other embodiments, the second BMC formulation and the third BMC formulation can comprise carbon staple fibers having the same average length.

Turning to FIG. 4B, a top-down view of an example embodiment of an uncured or partially-cured BMC preform layer 410 is provided. According to one aspect of the embodiment, the uncured or partially-cured BMC preform layer 410 can comprise a first BMC formulation. Furthermore, according to another aspect of the embodiments, uncured or partially-cured BMC preform layer 410 can comprise a single body having an annular shape. In other embodiments, uncured or partially-cured BMC preform layer 410 can comprise multiple bodies such as, for example, two halves of an annular shape or four quarters of an annular shape.

Turning to FIG. 4C, a top-down view of an example embodiment of an uncured or partially-cured structural preform layer 440 is provided. According to one aspect of the embodiment, the uncured or partially-cured structural preform layer 440 can comprise a third BMC formulation, as described above. Furthermore, according to another aspect of the embodiments, uncured or partially-cured structural preform layer 440 can comprise a single body having an annular shape. In other embodiments, uncured or partially-cured structural preform layer 440 can comprise multiple bodies such as, for example, two halves of an annular shape, or four quarters of an annular shape.

Turning to FIG. 4D, a top-down view is provided of an example embodiment of a plurality of uncured or partially-cured BMC structural preforms 425 and ventilation cores 420. According to one aspect of the embodiment, the uncured or partially-cured BMC structural preforms 425 can comprise a second BMC formulation. In some embodiments, each ventilation core 420 can be positioned adjacent to an uncured or partially-cured BMC structural preform 425, such as in an alternating manner, as shown. In other embodiments, however, other configurations are possible, such as positioning two, three or four uncured or partially-cured BMC structural preforms 425 between each pair of ventilation cores 420. Along the same lines, although FIG. 4D depicts a configuration having ten ventilation cores 420 and ten uncured structural preforms 425, those of skill in the art will appreciate that any number of ventilation cores 420 and uncured or partially cured BMC structural preforms 425 can be utilized, and are fully within the scope of the present disclosure.

Figure 5B:
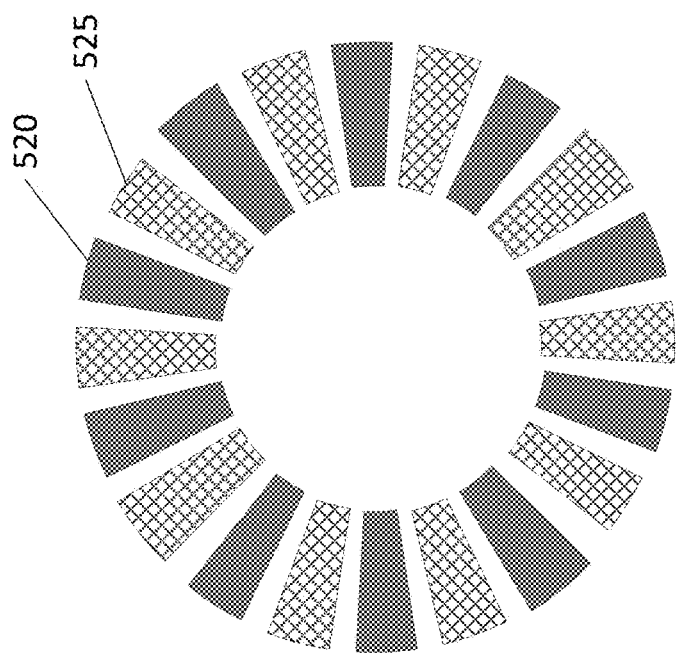
FIG. 5B is a top-down view of an example embodiment comprising a plurality of BMC structural preforms and ventilation cores.
Figure 5A:
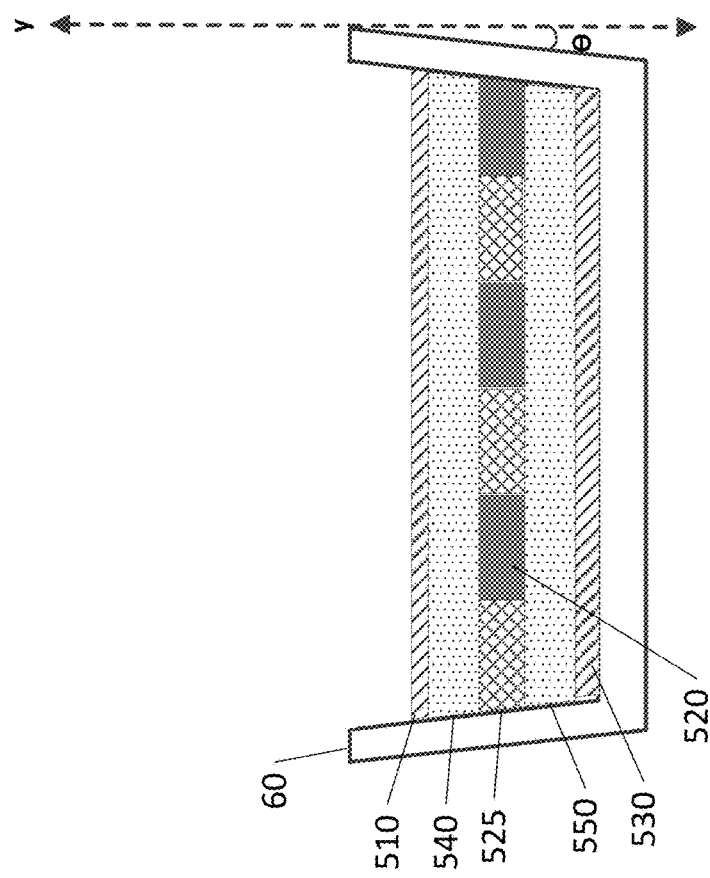
FIG. 5A is a cross-sectional view depicting another aspect of an example embodiment method, comprising a plurality of BMC preforms and ventilation cores in a mold cavity.

FIGS. 5A and 5B depict, respectively, a cross-sectional view of one aspect of another example embodiment method, and a top-down view of a plurality of uncured or partially-cured BMC structural preforms 520 and ventilation cores 525. In many respects, the embodiments reflected in FIGS. 5A and 5B are similar to the embodiments described with respect to FIGS. 4A and 4D. For example, according to some of the embodiments, positioned in the cavity of mold 60 are: (1) a pair of uncured or partially-cured BMC preform layers 510, 530, each comprising a first BMC formulation; (2) a plurality of ventilation cores 520 and at least one uncured or partially-cured structural preform 525, comprising a second BMC formulation; and (3) a pair of structural preform layers 540, 550, each comprising a third BMC formulation, and each being positioned between one of preform layer 510, 530 and the plurality of ventilation cores 520 and the at least one uncured or partially-cured structural preform 525. According to another aspect of the embodiments, the first, second and/or third BMC formulations can comprise the same materials as described with respect to FIG. 4A.

Referring to FIG. 5A, according to another aspect of some embodiments, mold 60 can be specially constructed to facilitate removal of the cured green body after press-molding. In some embodiments, for example, mold 60 can comprise at least one side surface that is non-perpendicular to a bottom surface of the mold. As can be seen in FIG. 5A, mold 60 includes a side surface that is at an angle, θ, from the y-axis, wherein the y-axis is perpendicular to the bottom surface of mold 60. In some embodiments, for example, angle, θ, between the side surface of mold 60 and y-axis, which is perpendicular to a bottom surface of mold 50, can preferably be in a range between 0° to 30°. Those of skill in the art, however, will appreciate that angle, θ, can be larger than 30°, and those embodiments are fully within the scope of the present disclosure.

Figure 5C:
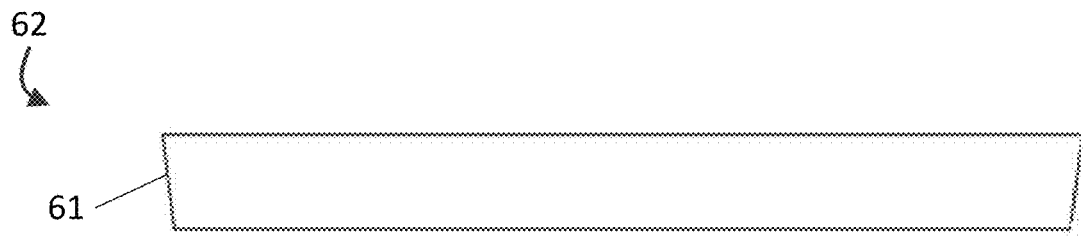
FIGS. 5C, 5D, and 5E depict side views of various components of an example embodiment of a mold for use in manufacturing carbon ceramic brake discs.
Figure 5D:
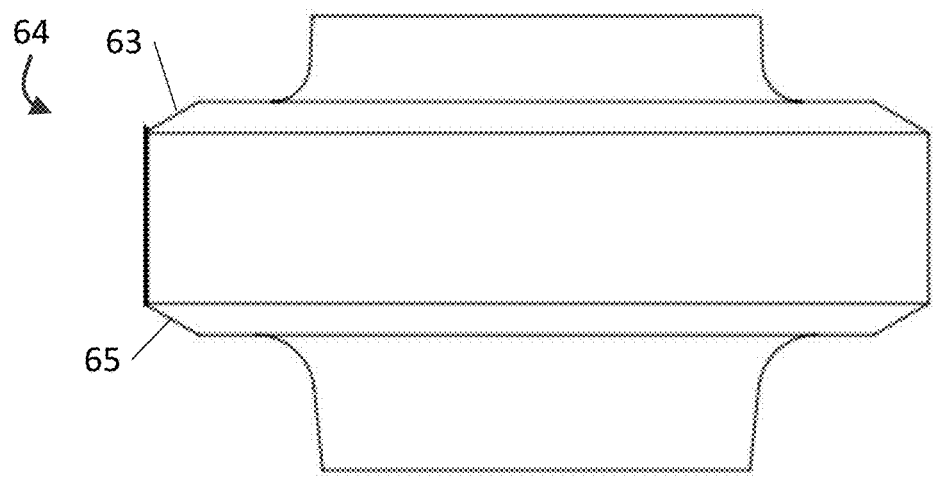
Figure 5E:
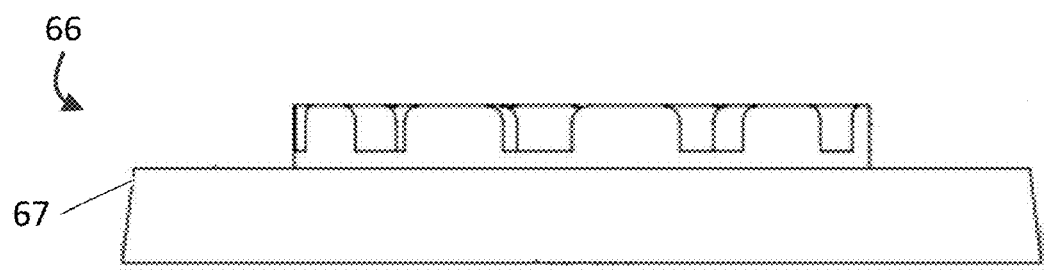

Turning to FIGS. 5C, 5D, and 5E, according to another aspect of some embodiments, depicted are side views of various mold components having tapered surfaces and edges to facilitate removal of the cured green body after press-molding. As can be seen in FIG. 5C, in some embodiments, for example, a mold can comprise a top piston 62 having a tapered lateral surface 61. According to one aspect of the embodiment, top piston 62 can have the greatest width at the top portion of the piston, and the smallest width at the bottom portion of the piston. In other embodiments, as shown in FIG. 5D, a mold can comprise a center piston 64 having a top tapered surface 63 and a bottom tapered surface 65. According to an aspect of the embodiment, center piston 64 can have the greatest width in the center portion of the piston, and the smallest width at the top and bottom portions of the piston. Similarly, as shown in FIG. 5E, a mold can comprise a bottom piston 66 having a tapered lateral surface 67. According to an aspect of the embodiment, bottom piston 66 can have the greatest width at the bottom portion of the piston and the smallest width at the top portion of the piston. Those of skill in the art will appreciate that, for any of the mold components and others, tapered surfaces can comprise either continuous or non-continuous tapered surfaces, and further comprise either linearly tapered or non-linearly tapered surfaces.

Figure 5F:
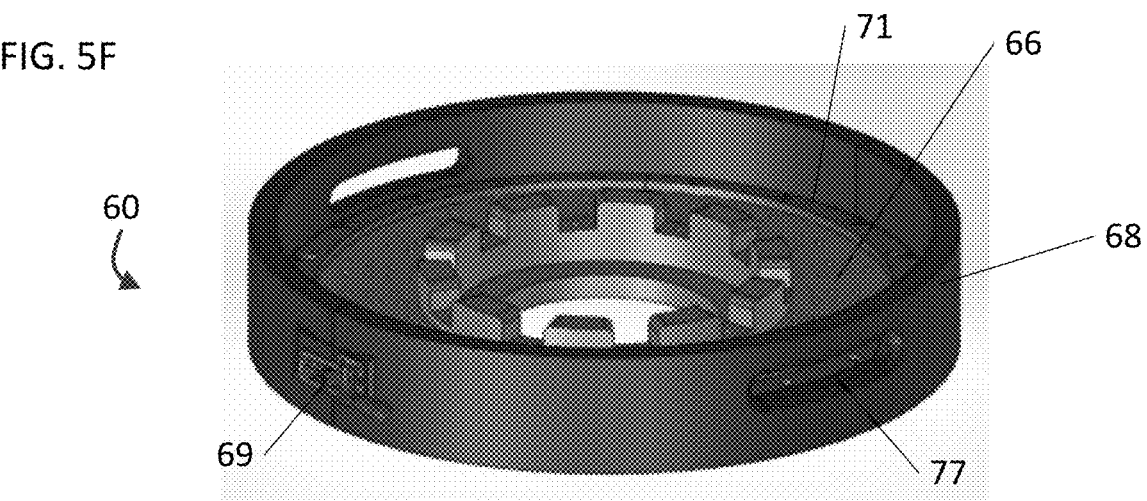
FIGS. 5F, 5G, and 5H depict top-down perspective views of an example embodiment of a mold in various stages of assembly.
Figure 5G:
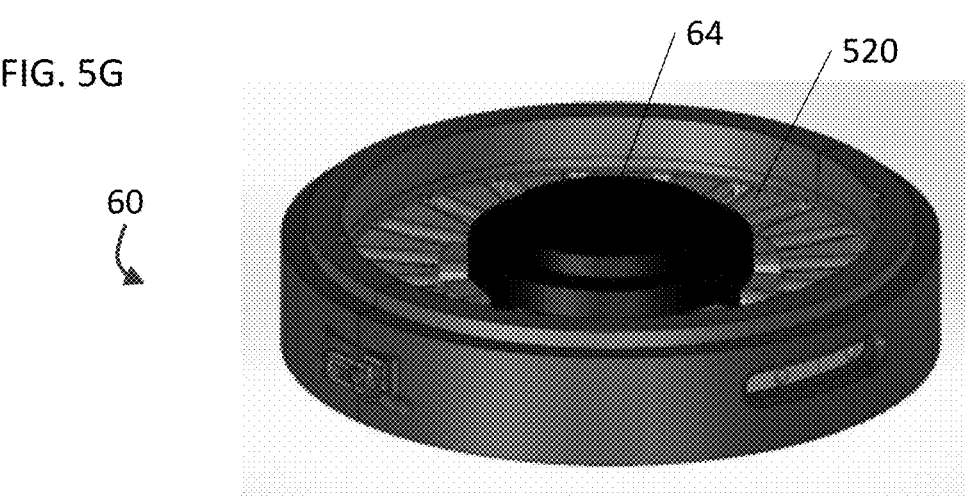
Figure 5H:
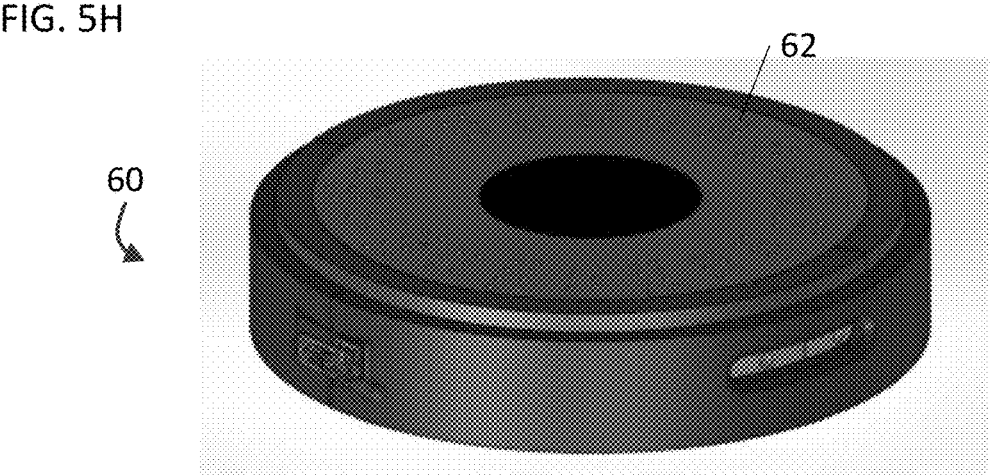

To further illustrate these example embodiments, FIGS. 5F, 5G, and 5H are top-down perspective views of an example embodiment of mold 60 in various stages of assembly. Referring first to FIG. 5F, mold 60 can comprise an outer retainer ring 68 which can include one or more latch segments 69 and, in some embodiments, one or more lateral apertures 77, through which pins of ventilation cores can be accessed, removed and/or inserted. In many embodiments, bottom piston 66 and bottom holding ring 71 can be disposed within a bottom portion of outer retainer 68. According to one aspect of the embodiments, one or more uncured or partially cured BMC preform layers (e.g., frictional and/or structural layers) can then be placed on top of bottom piston 66 and bottom holding ring 71.

Referring to FIG. 5G, in many embodiments, mold 60 can further comprise center piston 64, such as the embodiment described with respect to FIG. 5D. A plurality of ventilation cores 520 (such as those described with respect to FIGS. 3A, 3C, 4A, 4D, 5A, 5B, 6A, 6B, 6C, 6D, and 6E) and uncured or partially cured BMC preform structures (not shown) can then be positioned in a radial array around center piston 64, and in alignment with bottom holding ring 71. In some embodiments, top holding ring 73 can subsequently be positioned within mold 60 above the ventilation cores 520 and uncured or partially cured BMC preform structures. According to another aspect of the embodiments, one or more uncured or partially cured BMC preform layers (e.g., frictional and/or structural layers) can then be positioned over ventilation cores 520 and the uncured or partially cured BMC preform structures. Finally, referring to FIG. 5H, top piston 62 can be positioned within and at the top of mold 60.

Those of skill in the art will understand that the various mold components described herein can be utilized during one or more of the method steps described with respect to FIGS. 1 and 2. Likewise, the method steps described with respect to FIGS. 1 and 2 can be implemented utilizing one or more combinations of any of the various mold components described herein.

Example Embodiments of Ventilation Cores

Example embodiments of ventilation cores used for manufacturing carbon ceramic brake discs will now be described. Those of skill in the art will understand that any of the following ventilations cores can be implemented, either individually or in combination, by any of the example method embodiments described with respect to FIGS. 1, 2, and 9, and furthermore, can be implemented as part of any of the example embodiments of in-mold configurations, as previously described with respect to FIGS. 3A, 3C, 4A, 4D, 5A, and 5B.

Figure 6A:
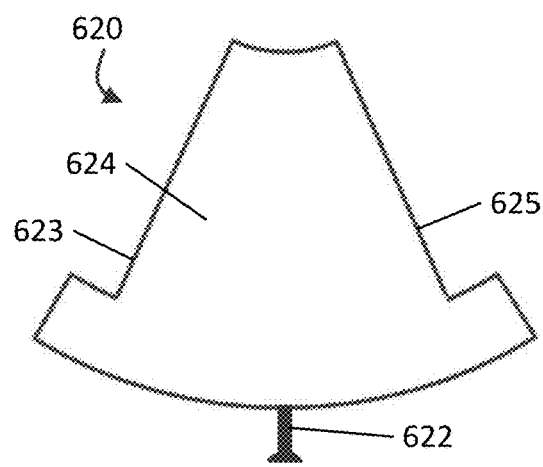
FIGS. 6A and 6B depicts, respectively, a top-down and side view of an example embodiment of a ventilation core.
Figure 6B:
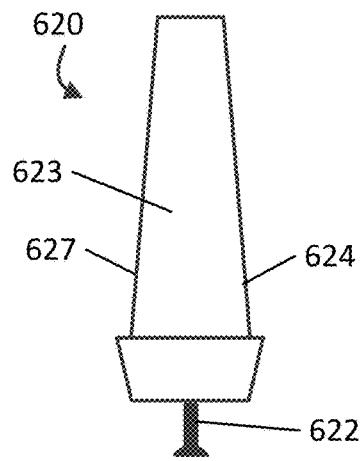

Turning to FIGS. 6A and 6B, a top-down view and a side view, respectively, are provided of an example embodiment of a ventilation core 620 for use in manufacturing a carbon ceramic brake disc. According to one aspect of the embodiment, each ventilation core 620 can have a wedge-like shape comprising a top surface 624, a bottom surface 627, a first side surface 623, and a second side surface 625. In many of the embodiments, ventilation core 620 can also include a removable pin 622 disposed on an outward-facing surface of ventilation core 620, wherein pin 622 is configured to secure the ventilation core 620 during warm-pressing and to facilitate removal of the ventilation core 620 from the cured green body. Furthermore, in many of the embodiments, as best seen in FIG. 6A, the first side surface 623 and the second side surface 625 can form a first set of tapered edges for each of the top surface 624 and the bottom surface 627. Similarly, as best seen in FIG. 6B, the top surface 624 and the bottom surface 627 can form a second set of tapered edges for each of the first side surface 623 and second side surface 625. In this regard, according to one aspect of some embodiments, the two sets of tapered edges are configured to facilitate ease-of-removal of ventilation core 620 from the cured green body.

Figure 6C:
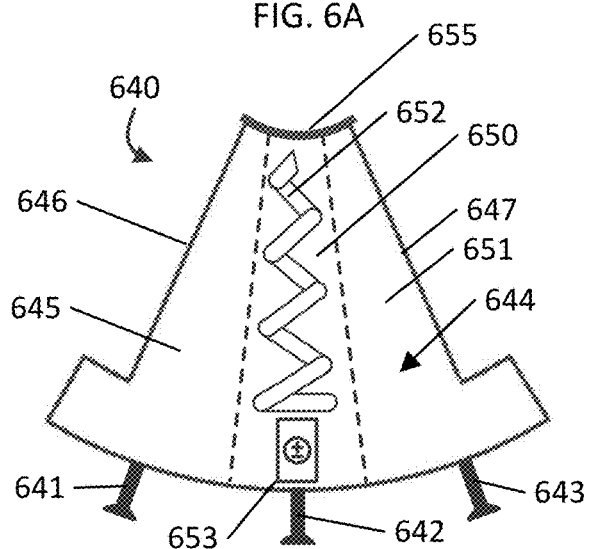
FIGS. 6C and 6D depicts, respectively, a top-down and side view of an example embodiment of a ventilation core.
Figure 6D:
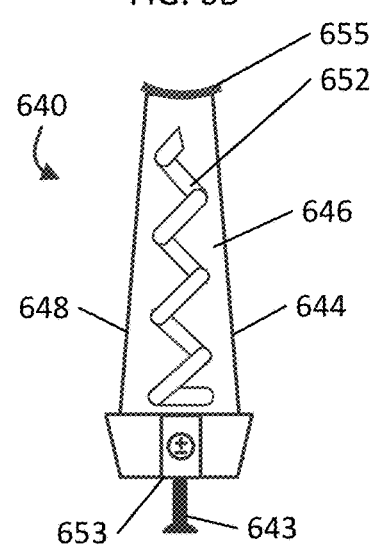

FIGS. 6C and 6D depict, respectively, a top-down view and a side view of another example embodiment of a ventilation core 640 for use in manufacturing a carbon ceramic brake disc. In many respects, the embodiment of FIGS. 6C and 6D is similar to the embodiment described with respect to FIGS. 6A and 6B. For example, ventilation core 640 can have a wedge-like shape comprising a top surface 644, a bottom surface 648, a first side surface 646, and a second side surface 647. In many of the embodiments, ventilation core 640 can include one or more removable pins 641, 642, 643 disposed on an outward-facing surface of ventilation core 640, wherein pins 641, 642, 643 are configured to secure the ventilation core 640 during warm-pressing and to facilitate removal of ventilation core 640 from the cured green body. Similarly, as best seen in FIG. 6C, the first side surface 646 and the second side surface 647 can form a first set of tapered edges for each of the top surface 644 and the bottom surface 648. Likewise, as best seen in FIG. 6D, the top surface 644 and the bottom surface 648 can form a second set of tapered edges for each of the first side surface 646 and the second side surface 647. In this regard, the two sets of tapered edges are configured to facilitate ease-of-removal of ventilation core 640 from the cured green body.

According to another aspect of the embodiment, each ventilation core 640 can be constructed from a plurality of modular portions which can be assembled and/or disassembled to allow for ease-of-removal from the cured green body. In some embodiments, for example, ventilation core 640 can include a first side portion 645 and a second side portion 651, with a center portion 650 disposed therebetween, as best seen in FIG. 6C. According to one aspect of the embodiment, the first side portion 645 can include the first side surface 646, and the second side portion 651 can include the second side surface 647. According to another aspect of the embodiment, the first side portion 645 and the second side portion 651 can be connected by a biasing element 655, which can be constructed from a flexible metal such as aluminum or titanium, and which can be configured to bias the first side portion 645 and second side portion 651 toward each other. According to another aspect of the embodiment, the center portion 650 can be configured to be removed such that the first side portion 645 and second side portion 651 flexibly collapse toward each other when center portion 650 is removed. In sum, according to the embodiments, after warm-pressing is complete, center portion 650 can be removed from ventilation core 640, causing the first and second side portions 645, 651 to flexibly collapse toward each other thereafter, and thereby facilitating removal of the ventilation core 640 from the cured green body.

According to another aspect of the embodiment, one or more ventilation cores 640 can include a heating element 652 coupled to an electrode 653, wherein the electrode 653 can be configured to pass electric current through heating element 652 to facilitate increasing the temperature within the mold cavity in an efficient manner. In some embodiments, heating element 652 can be a coil, as shown in FIGS. 6C and 6D. In other embodiments, heating element 652 can be a ribbon (straight or corrugated), or a strip of wire. Heating element 652 can comprise a metal alloy material such as, for example, nichrome (e.g., 80% nickel, 20% chromium), platinum, kanthal, and cupronickel, or a ceramic material such as, for example, molybdenum disilicide. Those of skill in the art will appreciate that other materials can be utilized for heating element 652 and are fully within the scope of the present disclosure.

Figure 6E:
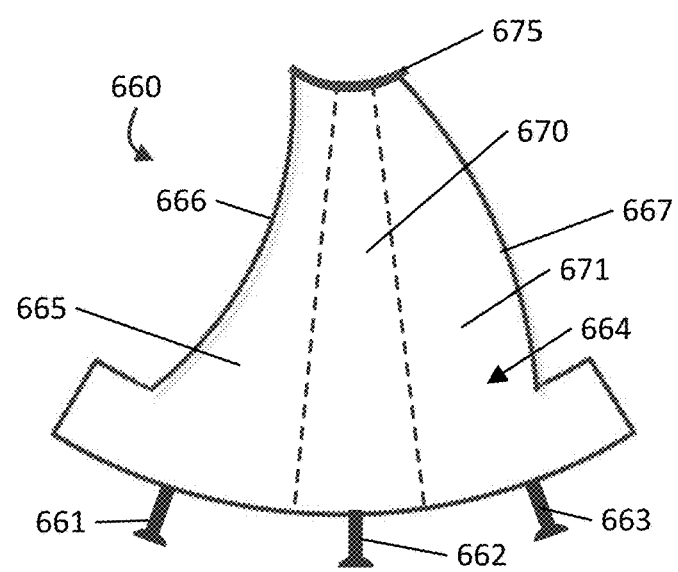
FIG. 6E depicts a top-down view of another example embodiment of a ventilation core.

FIG. 6E depicts a top-down view of yet another example embodiment of a ventilation core 660 for use in manufacturing a carbon ceramic brake disc. In many respects, the embodiment of FIG. 6E is similar to the embodiment described with respect to FIGS. 6C and 6D. For example, ventilation core 660 can have a wedge-like shape comprising a top surface 664, a bottom surface (not shown), a first side surface 666, and a second side surface 667. In many of the embodiments, ventilation core 660 can include one or more removable pins 661, 662, 663 disposed on an outward-facing surface of ventilation core 660, wherein pins 661, 662, 663 are configured to secure the ventilation core 660 during warm-pressing and to facilitate removal of ventilation core 660 from the cured green body. Similarly, the first side surface 666 and the second side surface 667 can form a first set of tapered edges for each of the top surface 664 and the bottom surface (not shown). Likewise, the top surface 664 and the bottom surface (not shown) can form a second set of tapered edges for each of the first side surface 666 and the second side surface 667. In this regard, the two sets of tapered edges are configured to facilitate ease-of-removal of ventilation core 660 from the cured green body.

According to another aspect of the embodiment, each ventilation core 660 can be constructed from a plurality of modular portions which can be assembled and/or disassembled to allow for ease-of-removal from the cured green body. In some embodiments, for example, ventilation core 660 can include a first side portion 665 and a second side portion 671, with a center portion 670 disposed therebetween. According to one aspect of the embodiment, the first side portion 665 can include the first side surface 666, and the second side portion 671 can include the second side surface 667. According to another aspect of the embodiment, the first side portion 665 and the second side portion 671 can be connected by a biasing element 675, which can be constructed from a flexible metal such as aluminum or titanium, and which can be configured to bias the first side portion 665 and second side portion 671 toward each other. According to another aspect of the embodiment, the center portion 670 can be configured to be removed such that the first side portion 665 and second side portion 671 flexibly collapse toward each other when center portion 670 is removed. In sum, according to the embodiments, after warm-pressing is complete, center portion 670 can be removed from ventilation core 660, causing the first and second side portions 665, 671 to flexibly collapse toward each other thereafter, and thereby facilitating removal of the ventilation core 660 from the cured green body.

According to another aspect of the embodiment, ventilation core 660 can include curved surfaces configured to form curved ventilation shafts in the carbon ceramic brake disc. In some embodiments, for example, the first side surface 666 can include an inwardly curved surface, such as a concave surface, and the second side surface 667 can include an outwardly curved surface, such as a convex surface. In other embodiments, the first side surface 666 can include an outwardly curved surface, such as a convex surface, and the second side surface 667 can include an inwardly curved surface, such as a concave surface. In this manner, according to some embodiments, curved ventilation shafts disposed in the center of the carbon ceramic brake disc are left behind when ventilation core 660 is removed from the cured green body.

Those of skill in the art will appreciate that any of the individual features or elements of the example embodiments of ventilation cores can be combined, and such embodiments are fully within the scope of the present disclosure.

Example Embodiments of Carbon Ceramic Brake Discs

Example embodiments of carbon ceramic brake discs will now be described. Those of skill in the art will understand that any of the following carbon ceramic brake discs can be manufactured by any of the example method embodiments as previously described with respect to FIGS. 1, 2, and 9, and can also be manufactured using any of the example embodiments of in-mold configurations, as previously described with respect to FIGS. 3A, 3C, 4A, 4D, 5A, and 5B, and/or can also be manufactured using any of the example embodiments of ventilation cores as previously described with respect to FIGS. 6A to 6E.

Figure 7B:
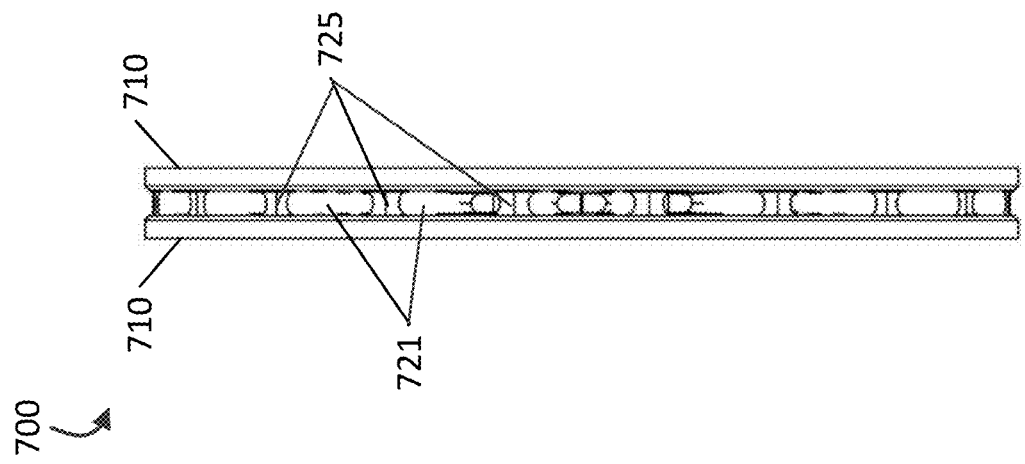
FIGS. 7A and 7B depict, respectively, a top-down and side view of an example embodiment of a carbon ceramic brake disc.
Figure 7A:
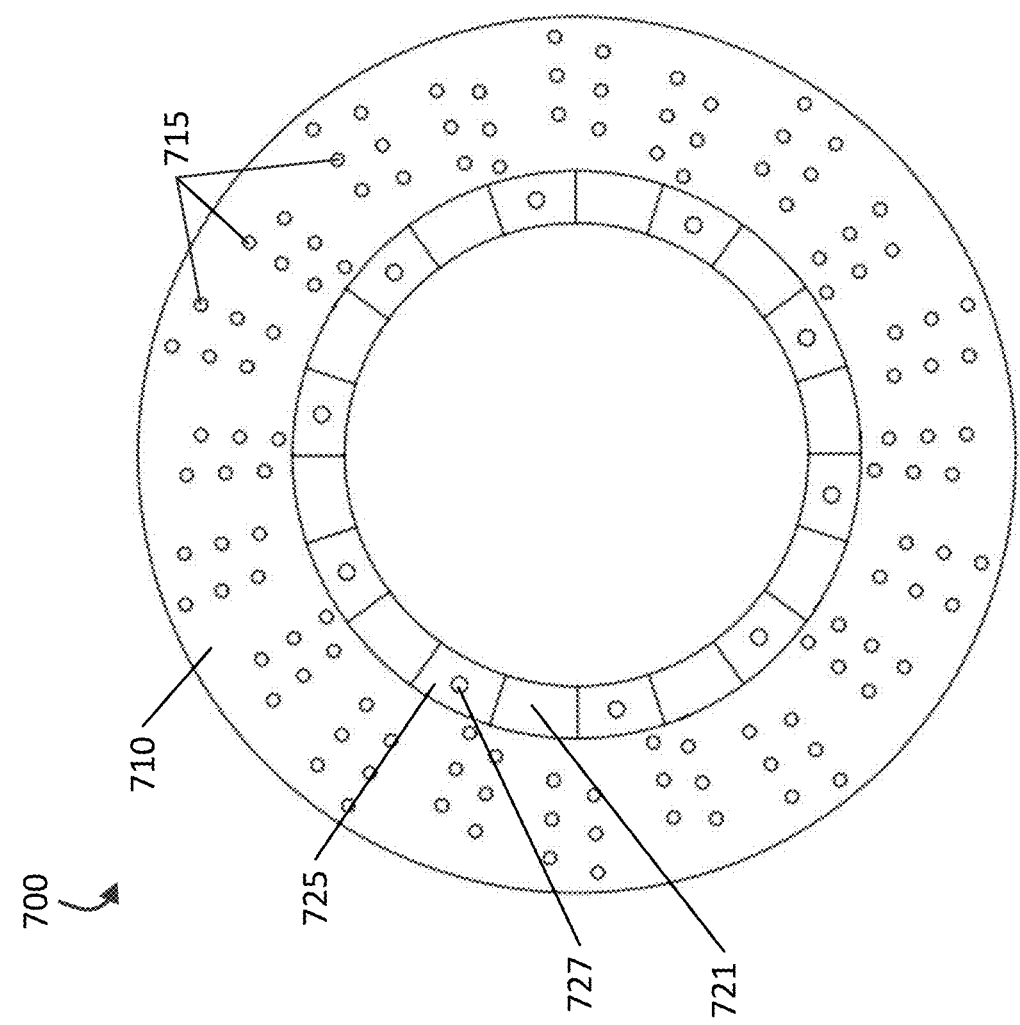

FIGS. 7A and 7B depict, respectively, a top-down view and a side view of an example embodiment of carbon ceramic brake disc 700. According to one aspect of the embodiments, carbon ceramic brake disc can comprise a generally annular shape, and include a pair of friction layers 710 with a plurality of structural columns 725 disposed therebetween. In many of the embodiments disclosed herein, the carbon ceramic brake disc can comprise a silicon-carbide-ceramic or silicon-oxycarbide-ceramic material which can be formed as a result of a polymer infiltration and pyrolysis ("PIP") process, wherein friction layers 710 can comprise a material formed from a first BMC formulation and plurality of structural columns 725 can comprise a material formed from a second BMC formulation. According to another aspect of the embodiments, the spaces between the plurality of structural columns 725 can serve as ventilation shafts 721.

As can be seen in FIG. 7A, carbon ceramic brake disc 700 can also include a plurality of ventilation holes 715 drilled into the friction layer 710. Those of skill in the art will appreciate that some embodiments of carbon ceramic brake disc 600 can have no ventilation holes. Furthermore, in some embodiments, carbon ceramic brake disc 700 can also include a plurality of mounting apertures 727 drilled into a surface of a structural portion of carbon ceramic brake disc 700, wherein the plurality of mounting apertures 727 are configured to receive attachment means (e.g., bolts, threaded rods, screws) for attaching a hat portion of a braking system.

Figure 8:
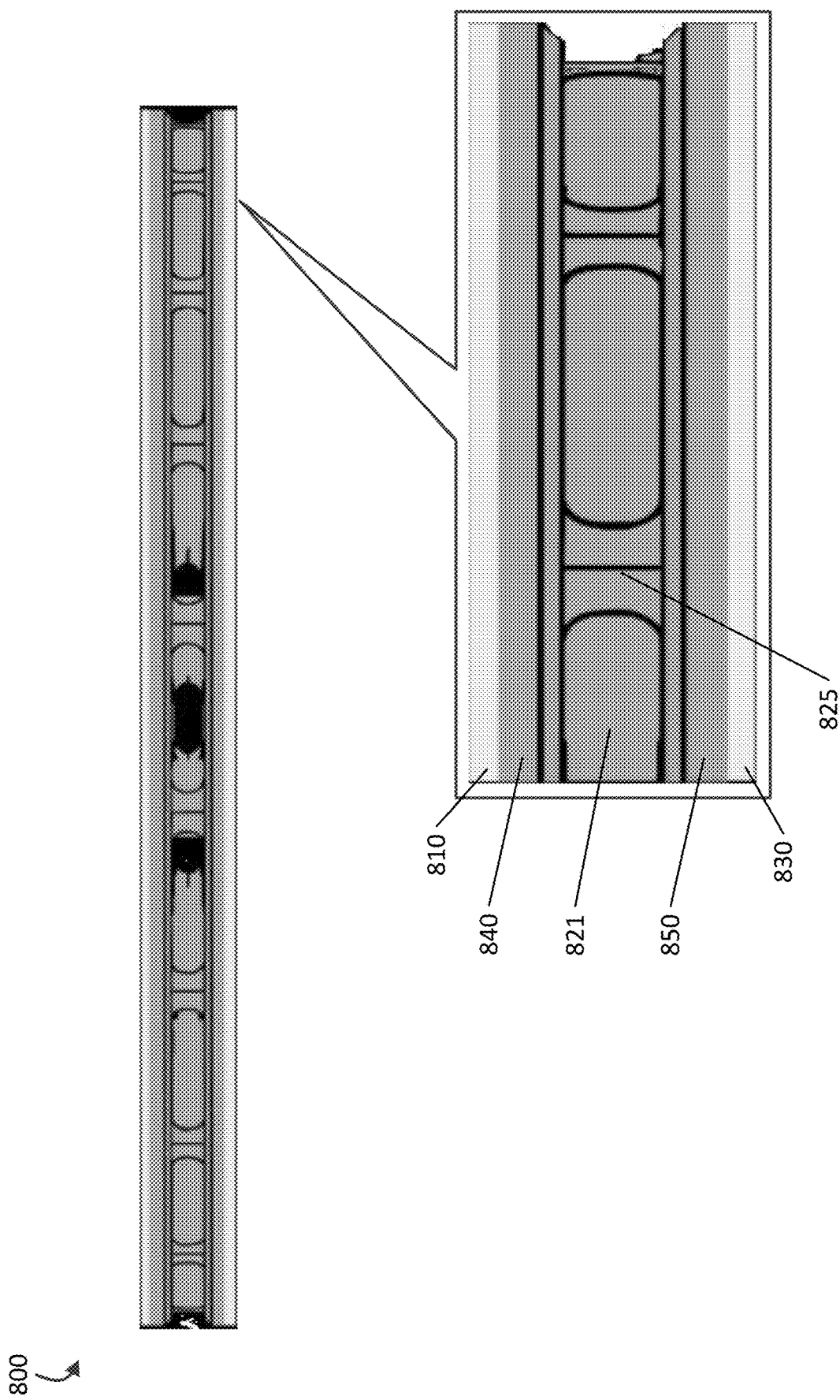
FIG. 8 depicts a side view and a call-out view of an example embodiment of a carbon ceramic brake disc.

Turning to FIG. 8, a side view and a call-out view of an example embodiment of carbon ceramic brake disc 800 are provided. According to one aspect of the embodiments, carbon ceramic brake disc 800 can comprise friction layers 810, 830 having a higher proportion of silicon-carbide-ceramic or silicon-oxycarbide-ceramic than structural layers 840, 850. For example, in some embodiments, friction layers 810, 830 can be manufactured from a first material comprising carbon staple fibers each having an average length preferably ranging from 6 mm to 26 mm, but not to exceed 51 mm. Shorter fibers are more brittle and fracture more easily, but also provide a higher flow of material filling out the cavity of the mold which results in a denser and less porous surface which is smoother and has shown to extend the life of the brake rotor and brake pads.

In other embodiments, structural layers 840, 850 can be manufactured from a second material comprising carbon staple fibers each having a greater average length relative to the fibers used for the friction layer materials. Structural layer 840, 850 can also comprise a different concentration of carbon staple fibers, so as to optimize other qualities relating to ceramic brake disc 800, such as thermal management and structural strength. In some embodiments, for example, an anti-oxidative coating can be applied to the structural layers 840, 850. In other embodiments, an anti-oxidative material can be included in the BMC formulation prior to press-molding. According to another aspect of the embodiments, as can be seen in the call-out view, structural columns 825 can be manufactured from a third material comprising carbon staple fibers having an average length different from the first or second materials described above. Structural columns 825 can also comprise a concentration of carbon staple fibers that is different from the first and third materials described above. As can also be seen in the call-out view of FIG. 8, ventilation shafts 821 can be disposed adjacent to each structural column 825.

According to some embodiments, structural columns 825 can be manufactured from the second material, i.e., the same material used to manufacture structural layers 840, 850.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A method of manufacturing a carbon ceramic brake disc, the method comprising:
    placing a plurality of molding compound layers and a plurality of ventilation cores in a cavity of a mold, wherein the plurality of molding compound layers includes one or more friction layers comprising a first molding compound formulation and one or more structural layers comprising a second molding compound formulation that is different from the first molding compound formulation, and wherein the first molding compound formulation is a dry molding compound, and the second molding compound formulation is a bulk molding compound;
    press-molding the plurality of molding compound layers in the mold at a first predetermined temperature and a first predetermined pressure to form a cured green body;
    removing the plurality of ventilation cores from the cured green body;
    pyrolyzing the cured green body in a first inert atmosphere at a second predetermined temperature to form a pyrolyzed body; and
    placing the pyrolyzed body in a vacuum furnace with a silicon powder and heating the pyrolyzed body in a second inert atmosphere to a third predetermined temperature to form a silicon-infiltrated body.

2. The method of claim 1, further comprising machining the silicon-infiltrated body.

3. The method of claim 1, further comprising:
    coating the silicon-infiltrated body with an anti-oxidation coating; and
    polishing the silicon-infiltrated body.

4. The method of claim 1, further comprising scanning the silicon-infiltrated body for defects with an ultrasonic or an x-ray device.

5. The method of claim 1, further comprising decreasing a pressure in the vacuum furnace to a negative pressure, after placing the pyrolyzed body in the vacuum furnace.

6. The method of claim 1, wherein the one or more friction layers comprise an annular shape.

7. The method of claim 1, wherein the one or more structural layers comprise a wedge shape.

8. The method of claim 1, wherein each of the plurality of ventilations cores is adjacent to at least one of the one or more structural layers.

9. The method of claim 1, wherein the first molding compound formulation comprises a first plurality of carbon fibers, wherein the second molding compound formulation comprises a second plurality of carbon fibers, and wherein an average length of the second plurality of carbon fibers is greater than an average length of the first plurality of carbon fibers.

10. The method of claim 9, wherein the average length of the first plurality of carbon fibers is between 5 millimeters and 30 millimeters, and wherein the average length of the second plurality of carbon staple fibers is less than 51 millimeters.

11. The method of claim 1, wherein the first molding compound formulation is characterized by a first percentage-mass of carbon fibers, wherein the second molding compound formulation is characterized by a second percentage-mass of carbon fibers, and wherein the second percentage-mass of carbon fibers is less than the first percentage-mass of carbon fibers.

12. The method of claim 1, wherein the one or more structural layers and the plurality of ventilation cores are disposed between the one or more friction layers.

13. The method of claim 1, further comprising:
    after removing the plurality of ventilation cores from the cured green body, drilling a plurality of ventilation holes through the cured green body.

14. The method of claim 1, further comprising:
    after removing the plurality of ventilation cores from the cured green body, shaving a thin layer from at least a portion of the cured green body.

15. The method of claim 1, further comprising repeating a series of steps until a measured physical characteristic is within a target parameter range, wherein the series of steps comprises:
    measuring a physical characteristic of the silicon-infiltrated body and comparing the measured physical characteristic to the target parameter range; and
    in response to determining that the measured physical characteristic is not within the target parameter range, placing the silicon-infiltrated body in the vacuum furnace with an additional amount of silicon powder and heating the silicon-infiltrated body to the third predetermined temperature.

16. The method of claim 14, wherein the physical characteristic is one or more of a weight of the silicon-infiltrated body or a density of the silicon-infiltrated body.

* * * * *